US008127295B1

United States Patent

(12) United States Patent
Jones et al.

(10) Patent No.: US 8,127,295 B1
(45) Date of Patent: Feb. 28, 2012

(54) SCALABLE RESOURCE ALLOCATION

(75) Inventors: Blake A. Jones, Oakland, CA (US); George R. Cameron, Santa Cruz, CA (US); Eric E. Lowe, Pflugerville, TX (US)

(73) Assignee: Oracle America, Inc., Redwood City, CA (US)

(*) Notice: Subject to any disclaimer, the term of this patent is extended or adjusted under 35 U.S.C. 154(b) by 1120 days.

(21) Appl. No.: 11/833,907

(22) Filed: Aug. 3, 2007
(Under 37 CFR 1.47)

(51) Int. Cl.
*G06F 9/46* (2006.01)

(52) U.S. Cl. ........................................ 718/104; 718/105

(58) Field of Classification Search ........................ None
See application file for complete search history.

(56) References Cited

U.S. PATENT DOCUMENTS

| | | | | |
|---|---|---|---|---|
| 5,504,670 | A * | 4/1996 | Barth et al. | 700/5 |
| 5,996,013 | A * | 11/1999 | Delp et al. | 709/226 |
| 6,466,559 | B1 * | 10/2002 | Johansson et al. | 370/335 |
| 6,584,489 | B1 * | 6/2003 | Jones et al. | 718/104 |
| 6,587,938 | B1 * | 7/2003 | Eilert et al. | 712/29 |
| 7,380,039 | B2 * | 5/2008 | Miloushev et al. | 710/244 |
| 7,644,410 | B1 * | 1/2010 | Graupner et al. | 718/104 |
| 7,814,491 | B1 * | 10/2010 | Chen et al. | 718/104 |
| 2003/0182503 | A1 * | 9/2003 | Leong et al. | 711/114 |
| 2005/0055694 | A1 * | 3/2005 | Lee | 718/100 |
| 2005/0198102 | A1 * | 9/2005 | Hahn et al. | 709/200 |
| 2005/0246710 | A1 * | 11/2005 | McLuckie et al. | 718/104 |
| 2006/0167732 | A1 * | 7/2006 | Ricketts | 705/8 |
| 2006/0236368 | A1 * | 10/2006 | Raja et al. | 726/1 |
| 2007/0118631 | A1 * | 5/2007 | Devarakonda et al. | 709/223 |
| 2007/0143767 | A1 * | 6/2007 | Attanasio et al. | 718/104 |
| 2007/0169127 | A1 * | 7/2007 | Kashyap | 718/104 |
| 2007/0198984 | A1 * | 8/2007 | Favor et al. | 718/104 |
| 2007/0294701 | A1 * | 12/2007 | Banavar et al. | 718/104 |
| 2008/0034370 | A1 * | 2/2008 | Huizenga | 718/104 |
| 2008/0104245 | A1 * | 5/2008 | Romero | 709/226 |
| 2008/0279167 | A1 * | 11/2008 | Cardei et al. | 370/342 |

* cited by examiner

*Primary Examiner* — Emerson Puente
*Assistant Examiner* — Hiren Patel
(74) *Attorney, Agent, or Firm* — Osha · Liang LLP

(57) ABSTRACT

A device, system, and method are directed towards managing limited resources in a computer system with multiple processing units. Each processing unit has a corresponding bucket. Each thread executing on a processing unit has a corresponding wallet. Buckets and wallets contain credits corresponding to units of the limited resource. When a request for the resource is made, mechanisms of the invention attempt to fulfill the request by looking in a local wallet, a local bucket, or non-local buckets. In a resource shortage situation, credits may be moved to a primary bucket. A load balancing mechanism may distribute credits among buckets, or move credits from wallets to buckets.

14 Claims, 5 Drawing Sheets

SCALABLE RESOURCE ALLOCATION

FIELD OF THE INVENTION

The present invention relates generally to resource allocation in computer systems and, more particularly, but not exclusively to allocating limited computing resources.

BACKGROUND OF THE INVENTION

Computing systems generally must include techniques for allocating limited resources to programs, processes, operating system kernels, or threads. Limited resources may include, but are not limited to, blocks of memory, disk blocks, blocks of mass storage, I/O bandwidth, CPU cycles, system data structures, and the like. Operating system kernels typically include data structures and methods for allocating and freeing limited resources. However, these techniques are not necessarily limited to operating system kernels, or even to operating systems.

A CPU cache is a block of memory that is used to temporarily store and access data that is likely to be used again. A CPU cache is a block of fast memory that is used by a CPU to access data. Typically, access to data in a CPU cache is faster than access to data in a computer's main memory or other data storage. A CPU cache is made up of a number of cache lines, each cache line being a unit of cache that is read from or written to by the CPU.

Generally, it is desirable to employ efficient techniques for allocating limited resources. Efficient in this context may mean an improvement in time, processing time, amount of memory, or other resources. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1:
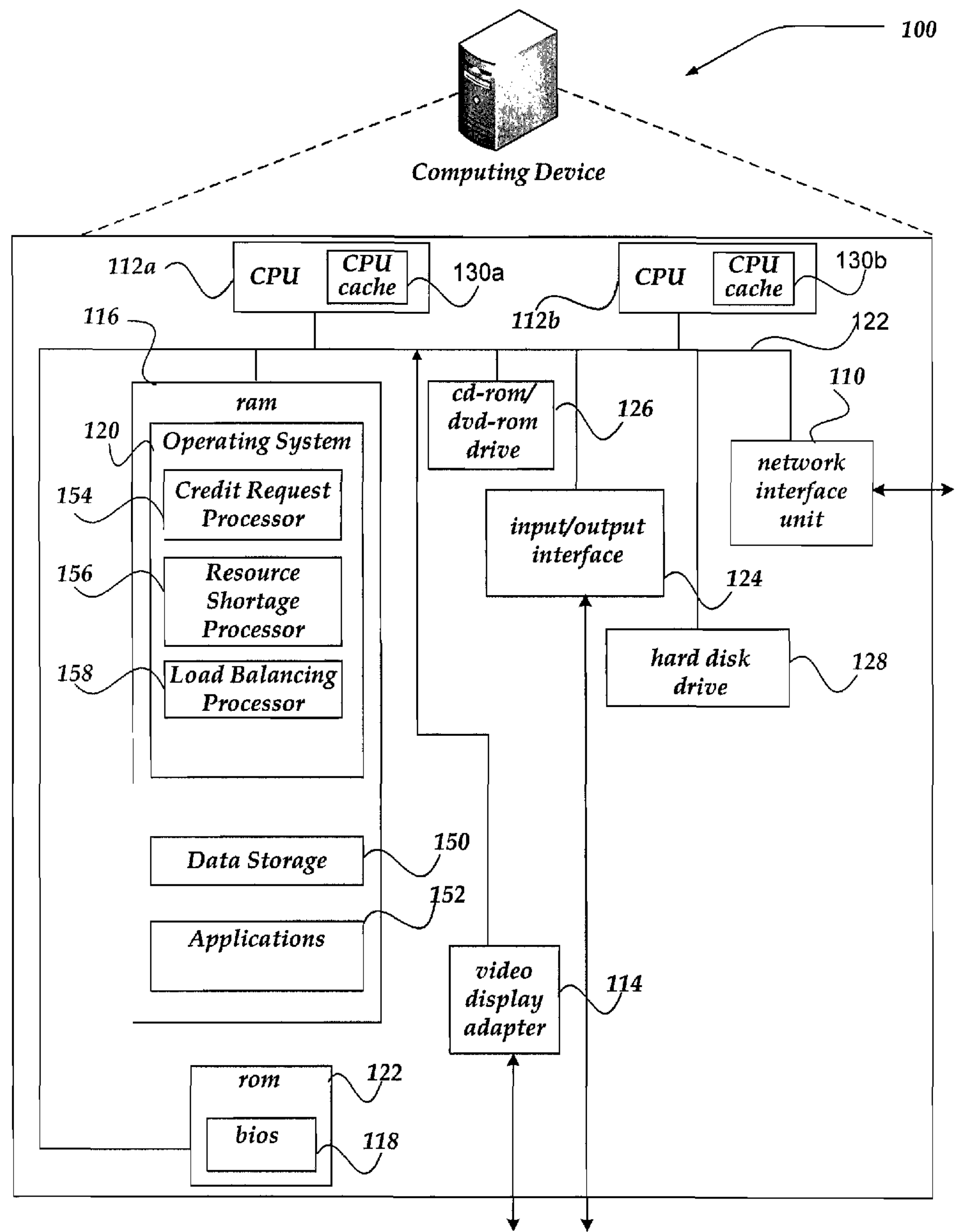
FIG. 1 shows one embodiment of a computing device that may be employed in a system implementing the invention.

The present invention will now be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "resource" refers to an abstraction or hardware that is limited in its availability. Generally a resource may be allocated by a controlling mechanism, such as an operating system kernel. Computer memory is an example of a resource.

As used herein, the term "resource credit," or simply "credit" refers to an abstract unit that corresponds to a unit of a resource. For example, in one embodiment, one credit corresponds to one page of physical memory. A page of physical memory refers to a fixed-size amount of physical memory. In one embodiment, credits may be limited to integer values, though in some embodiments, they are not so limited.

As used herein, the term "wallet" refers to a data structure employed by mechanisms of the invention to store or cache resource credits available for allocation or consumption. A wallet can be considered to be a credit depository.

As used herein, the term "bucket" refers to a data structure employed by mechanisms of the invention to store resource credits available for allocation or consumption. Collectively, credits contained within buckets make up a pool of system-wide resource credits. In one embodiment, each CPU or processor core has one corresponding bucket. A bucket can be considered to be a credit depository.

Briefly stated, the present invention is directed toward a computer-based mechanism for managing a limited resource in a system having multiple processing units. Mechanisms of the invention may include providing multiple processing unit depositories, or buckets, wherein one bucket corresponds to each processing unit. Mechanisms of the invention may further include multiple thread depositories, or wallets, wherein one wallet corresponds to each thread executing on a processing unit. Each bucket or wallet may contain a number of credits, wherein each credit represents one unit of a limited resource.

Systems and methods of the invention may include receiving a request for a number of resource units, determining whether a local bucket contains enough credits to fulfill the request, and selectively determining whether one or more non-local buckets contain enough credits to fulfill the request, and load balancing the buckets by moving credits among them.

Systems and methods of the invention may include, in response to receiving the request, determining whether a local wallet and a local bucket in combination contain enough credits to fulfill the request, selectively moving credits from the local bucket to the local wallet, and deducting a number of credits from the wallet to fulfill the request.

Systems and methods of the invention may include receiving, in a second thread executing on a processing unit, a second request for resource units, in response to receiving the second request determining whether a local wallet contains enough credits to fulfill the second request, and deducting a number of credits from the local wallet to fulfill the second request.

Systems and methods of the invention may include selectively moving credits from each of the wallets to a corresponding local bucket. The selective action may be based on whether a resource shortage condition exists or whether a number of credits contained in each wallet exceeds a predetermined number of credits.

Systems and methods of the invention may include selectively blocking the requesting thread if there are not enough credits to fulfill the request, and selectively unblocking the thread after credits have been moved between buckets.

Systems and methods of the invention may include determining whether an aggregate of credits distributed among multiple buckets is sufficient to fulfill the request, and selectively moving credits to a local bucket or a primary bucket based on whether the aggregate of credits is sufficient.

Illustrative Operating Environment

FIG. 1 shows one embodiment of a computing device 100, according to one embodiment of the invention. The embodiment of computing device 100 illustrated in FIG. 1 may be used to implement all, or a portion of, methods of the present invention and associated methods. Computing device 100 may include many more components than those shown. It may also have less than all of those shown. The components shown, however, are sufficient to disclose an illustrative embodiment for practicing the invention. One or more computing devices, and the application programs integrated with the devices, may be used to implement various embodiments of methods of the present invention, as illustrated in FIGS. 2-5 and discussed herein. Multiple computing devices sharing resources may implement the present invention.

Computing device 100 includes central processing units (CPU) 112*a-b* (also referred to as processors), video display adapter 114, and a mass memory, all in communication with each other via bus 122. Each of central processing units 112*a-b* includes a CPU cache memory 130*a-b*, respectively. Cache memory 130*a-b* may be used to cache program instructions or data for use by the central processing unit 112*a-b*. Though not illustrated in FIG. 1, one or both of CPUs 112*a-b* may include multiple processor cores, each core being capable of executing program instructions. Two or more processor cores in a CPU may share a CPU cache, or each processor core may have a corresponding CPU cache independent of other processor cores. As used herein, the term core refers to a processor core. As used herein, the term "processing unit" may refer to a CPU or a processor core.

The mass memory generally includes RAM 116, ROM 122, and one or more permanent mass storage devices, such as hard disk drive 128, tape drive, optical drive, and/or floppy disk drive. The mass memory stores operating system 120 for controlling the operation of computing device 100. Any operating system, including a general-purpose operating system or a special-purpose operating system, may be employed. Basic input/output system ("BIOS") 118 is also provided for controlling the low-level operation of computing device 100. As illustrated in FIG. 1, computing device 100 also can communicate with the Internet, or some other communications network, via network interface unit 110, which is constructed for use with various communication protocols including, but not limited to, the TCP/IP protocol or Remote Direct Memory Access (RDMA). Network interface unit 110 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more data storage components 150 may include program code or data used by the operating system 120 or by applications 152. Data may be stored in ram 116 or other storage devices, such as hard disk drive 128. One or more applications 152 and application components are loaded into mass memory and run on operating system 120. Examples of application programs may include search programs, transcoders, schedulers, calendars, database programs, word processing programs, HTTP programs, customizable user interface programs, IPSec applications, encryption programs, security programs, VPN programs, SMS message servers, IM message servers, email servers, account management and so forth.

In one embodiment, operating system 120 may include a credit request processor 154. A credit request processor 154 may receive requests for one or more credits corresponding to units of a limited resource, and perform operations to allocate credits. Operations performed by a credit request processor 154 in accordance with the present invention are discussed in further detail herein.

In one embodiment, operating system 120 may include a resource shortage processor 156. A resource shortage processor 156 may be invoked when a credit request processor determines that there is a potential shortage of resource credits. The resource shortage processor may perform operations to locate, reclaim, and reallocate resource credits. Operations performed by a resource shortage processor in accordance with the present invention are discussed in further detail herein.

In one embodiment, operating system 120 may include a load balancing processor 158. A load balancing processor 158 may include program instructions that, when executed, distribute resource credits among data structures corresponding to CPUs or cores. Operations performed by a load balancing processor 158 in accordance with the present invention are discussed in further detail herein.

In one embodiment, computing device 100 may be a server in communication with one or more client computing devices or other servers. In one embodiment, computing device 100 may be a client device.

Communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Generalized Operation

Figure 2:
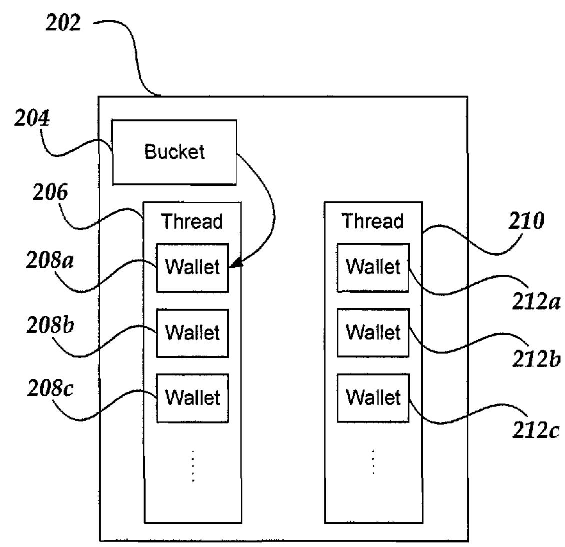
FIG. 2 is a block diagram generally showing an example of data structures that may be used in one embodiment of a method for allocating resources.

FIG. 2 is a block diagram illustrating data structures and components that may be used in accordance with an embodiment of the invention. FIG. 2 includes a representation of a processor 202. Processor 202 may be a CPU, such as CPU 112*a* or 112*b* of FIG. 1, or it may be a processor core in a multi-core CPU. In accordance with the invention, the environment of the invention may include one or more CPUs or cores. It may include a heterogeneous environment having one or more single-core CPUs, multi-core CPUs, or combinations thereof. In one embodiment, a core or CPU may be thought of as an execution unit that executes a thread dispatched by the operating system scheduler. In some embodiments, multiple computing devices, such as computing device 100, of FIG. 1, may share one or more types of resources, and the execution environment may include CPUs or cores in each computing device.

As illustrated in FIG. 2, each CPU or core may have a corresponding bucket 204. A bucket is a data structure that is used for storing a number of credits available for use. In one embodiment, each CPU or core has a corresponding bucket for each resource type to be managed.

For example, a CPU may have a bucket for managing physical memory pages in a virtual memory system, another bucket for managing I/O bandwidth, and another bucket for managing system data structures. Generally, in an environment having N CPUs or cores, there may exist N buckets for each resource type, in an embodiment of the invention. In an environment having R resource types, there may exist N X R buckets. Buckets may be referred to as "per CPU buckets," or PCBs. In one embodiment, each bucket is sized to fit within a CPU cache line.

Each CPU or core may execute and manage one or more execution threads. FIG. 2 illustrates threads 206 and 210. Typically, a CPU or core may manage many associated threads, though only two are illustrated. A thread may be an operating system kernel thread. Each thread has one or more corresponding wallets. As illustrated, thread 206 has corresponding wallets 208*a-c*, and thread 210 has corresponding wallets 212*a-c*. Each wallet corresponding to each thread corresponds to an associated type of resource. For example, wallets 208*a* and 212*a* may correspond to physical memory pages, wallets 208*b* and 212*b* may correspond to I/O bandwidth, and 208*c* and 212*c* may correspond to system data structures. Other combinations of resources may also be used in accordance with the invention.

In an embodiment of the invention having N CPUs or cores, N buckets maintain data representing a number of credits available for use by any thread, and each thread maintains one or more wallets that represent a number of credits available for use by that thread. Credits may be distributed in a variety of ways across the buckets and wallets, so that the total number of credits represents the total number of resource units, such as physical memory pages, that are available.

One or more credits may be moved from one bucket to another, from a wallet to a bucket, or from a bucket to a wallet, by deducting the number from a bucket or wallet and adding the number to another bucket or wallet. When one or more resource units are to be allocated for use by a thread, the corresponding number of credits may be deducted from one or more buckets or wallets, reducing the total number of credits by the number of allocated resource units. As used herein, the term "credit container" refers to a bucket or a wallet employed to maintain data representing resource credits. A credit container may also be referred to as a credit repository.

As used herein, the term "local" is used to reference components that correspond to the reference component, either directly or indirectly. For example, a thread's local wallet refers to the wallet corresponding to the thread, while a thread's local bucket refers to the bucket corresponding to the CPU or core that is currently executing the thread. In FIG. 2, thread 206 has local wallet 206*a-c* and a local bucket 204; thread 210 has local wallets 212*a-c* and a local bucket 204. In another example, local wallets of a bucket are the wallets that correspond to threads currently executing on a CPU or core corresponding to the bucket. In FIG. 2, bucket 204 has local threads 206 and 210, and local wallets 206*a-c* and 210*a-c*. A bucket and its corresponding CPU or core have the same set of local threads and local wallets. A thread and its corresponding wallet have the same local bucket and local CPU or core. As used herein, locality is a symmetric, but not a transitive relation.

In accordance with an embodiment of the invention, each credit container may have a corresponding system lock that is employed to avoid problems of different threads attempting to access the credit container. Typically, a credit container is locked prior to accessing the container, one or more operations are performed on the container, and then the credit container is unlocked. Operations may include reading the number of credits maintained by the credit container, deducting credits from the credit container, or adding credits to the credit container. A method may lock one or more credit containers at least partly concurrently. For example, when moving a set of credits from a first credit container to a second credit container, a method may perform a sequence including locking both credit containers, deducting the set of credits from the first container, freeing the first container, adding the set of credits to the second container, and then unlocking the second container. Similarly, other sequences of operations may include serially locking and unlocking one or more containers to avoid conflict and deadlock in the system.

In one embodiment of the invention, a thread, such as thread 206 of FIG. 2, may desire a set of resource units, such as physical memory pages. The thread may invoke a method to allocate a set of credits corresponding to the set of resource units. In one embodiment, a credit request processor, such as credit request processor 154 of FIG. 1 may be employed to perform a series of actions herein described, or a portion thereof.

Figure 4:
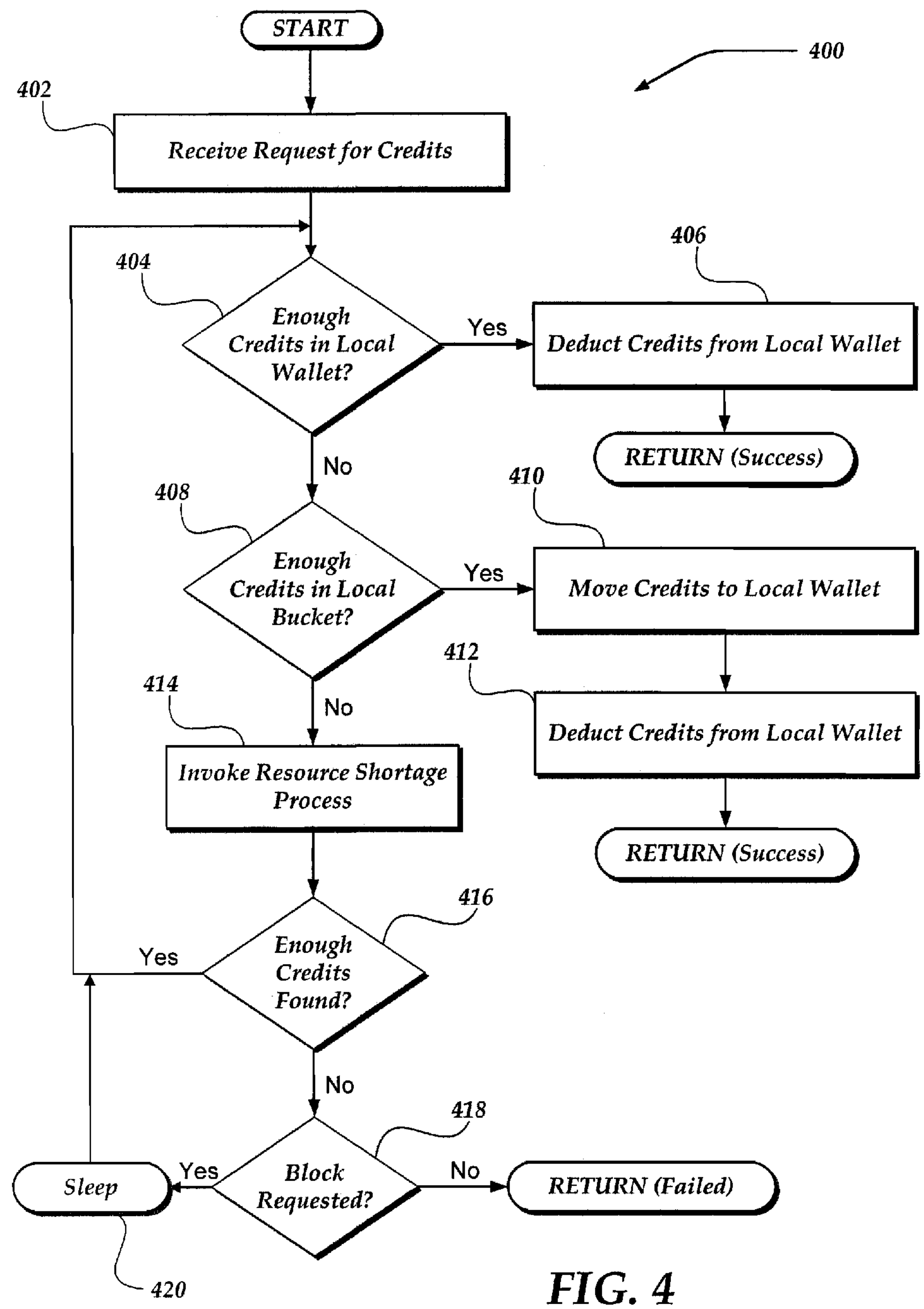
FIG. 4 is a logical flow diagram generally showing one embodiment of a method for allocating resources.
Figure 5:
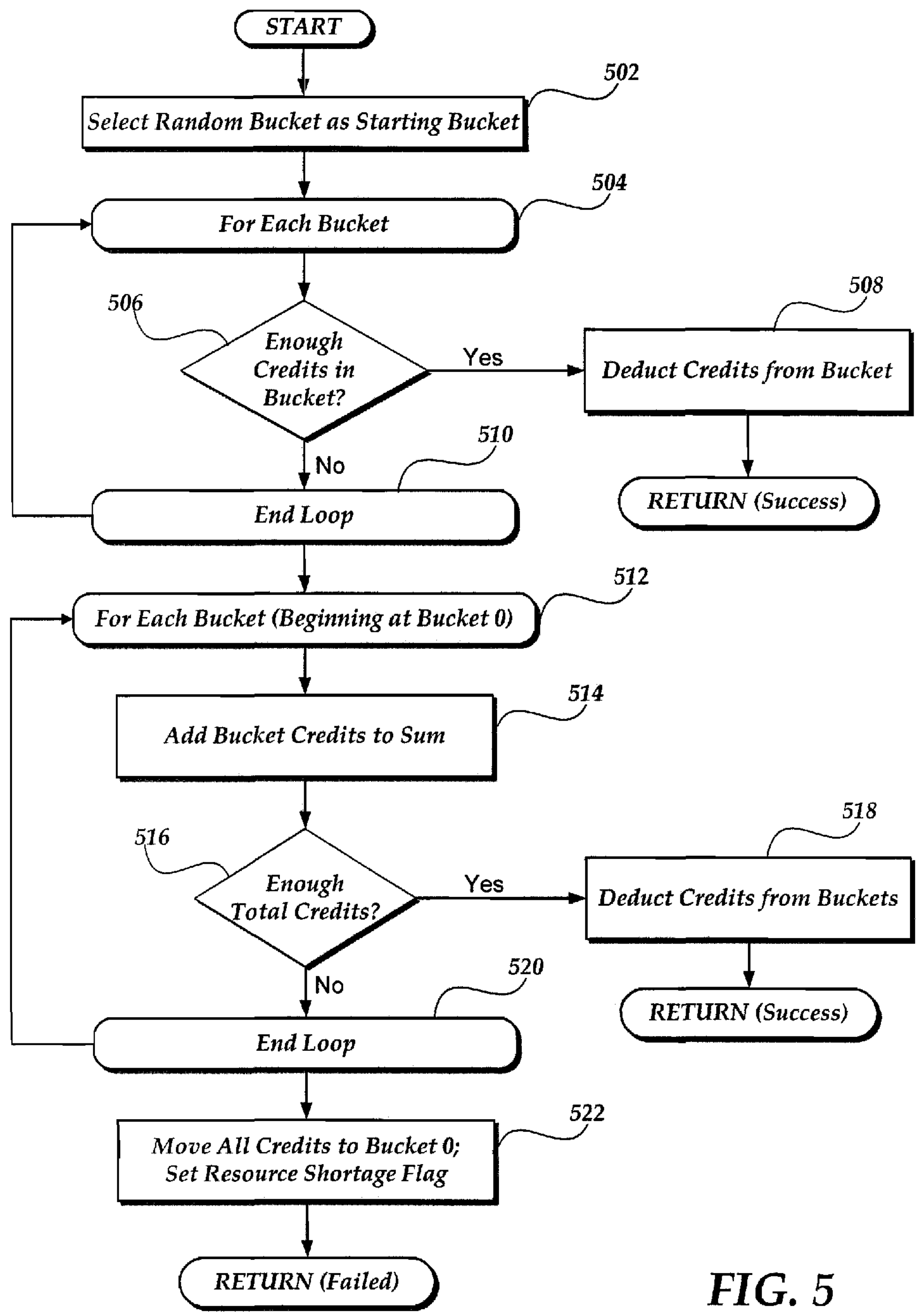
FIG. 5 is a logical flow diagram generally showing one embodiment of a method for allocating resources in a resource shortage environment.

A series of actions to allocate a set of credits for a thread may include determining whether the thread's local wallet, such as wallet 208*a*, contains enough credits. If it does, the credits may be deducted from the local wallet and allocated for use by the thread. If the local wallet does not contain enough credits, the actions may include determining whether the thread's local bucket, such as bucket 204, contains enough credits to make up the difference between the contents of the local wallet and the desired set of credits. If the local bucket has enough credits, the amount of credits may be moved from the local bucket to the local wallet, and subsequently deducted from the local wallet for use by the thread. If the local bucket does not have enough credits, an additional method pertaining to a resource shortage situation may be invoked. This method is illustrated in FIG. 5 and discussed in further detail herein. A method of allocating credits is illustrated in FIG. 4 and discussed in further detail herein.

In accordance with one aspect of the invention, one or more load balancing operations may be performed. A load balancing operation may traverse the various credit containers and move credits among them in order to balance the distribution of credits across credit containers. In one embodiment, one or more load balancing methods may move credits among buckets, and one or more other load balancing methods may move credits between a bucket and its local wallets. Load balancing operations may be performed by threads 206 or 210, or a separate thread may perform load balancing operations pertaining to the wallets of these threads. Load balancing operations are discussed in further detail herein.

Figure 3:
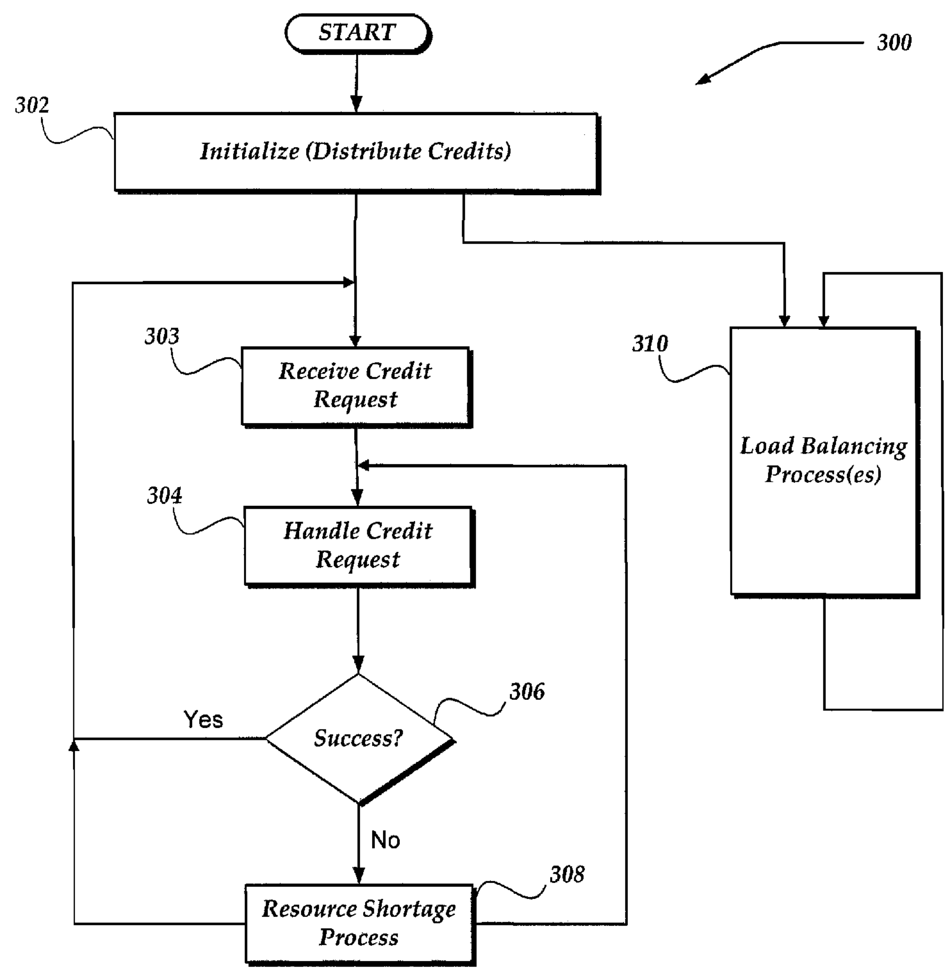
FIG. 3 is a logical flow diagram generally showing a high level view of one embodiment of a process for allocating resources.

FIG. 3 is a logical flow diagram generally showing one embodiment of a method 300 for allocating resources. Method 300 may employ at least a portion of the computing device 100 illustrated in FIG. 1, including credit request processor 154, resource shortage processor 156, load balancing processor 158, or any of the device variations discussed herein, or it may be performed with other devices. In one embodiment, method 300 employs at least a portion of the components illustrated in FIG. 2.

Method 300 begins, after a start block, at block 302, where initialization is performed. In one embodiment, initialization includes distributing credits among buckets such as bucket 204. A load balancing method, such as one of load balancing methods 310, may be employed during initialization to distribute credits. In one embodiment, initialization may include distributing credits among wallets, such as wallets 208*a* or 212*a* of FIG. 2.

After initialization, one or more action flows may occur. The action flows may occur at least partially concurrently. One of the action flows is represented by blocks 303, 304, 306, and 308. At block 303, a request for a resource credit is received. At block 304, the request is handled. This action may include determining whether a local wallet contains enough credits to handle the request, determining whether a local bucket contains enough credits to handle the request, or moving credits from the local bucket to a local wallet. A more detailed discussion of these actions is illustrated and discussed in FIG. 4.

Method 300 may then flow to block 306, where a determination is made of whether the method has been successful in locating and allocating enough credits to satisfy the credit request. If the method has been successful, the method may flow back to block 303, where a next request is received. If, at the decision block 306, it is determined that the method has not been successful, the method may flow to block 308, where a resource shortage method is performed.

The resource shortage method represented by block 308 may include determining whether any one of the non-local buckets contains enough credits to satisfy the credit request, moving credits from non-local buckets to a local bucket or to a designated primary bucket, or blocking the current thread until a change in credit distribution is detected. A more detailed discussion of these actions is illustrated and discussed in FIG. 5. After performing the actions of the resource shortage method 308, if the method is successful or if blocking is not desired, the method may flow to block 303, where a next credit request is received. If the actions of the resource shortage method 308 are not successful and blocking is desired, the thread may sleep and, when wakened by a signal indicating credits have been returned to the system, return back to block 304 to repeat the request handling.

The action flow represented by blocks 303, 304, 306, and 308 corresponds to a single thread that may be executing on a CPU or processor core. In accordance with the invention, multiple such action flows, each corresponding to a different execution thread, may be performed sequentially, partially concurrently, or completely concurrently. The method of the present invention allows these actions to be performed quickly even when many threads are executing them in parallel.

Block 310 represents one or more load balancing methods that may be performed. Any one or more of these methods may be performed concurrently with each other, or may be performed concurrently with the action flows represented by blocks 303, 304, 306, and 308.

Briefly, load balancing methods may redistribute resource credits among all buckets or a portion thereof. Load balancing among buckets may include distributing credits approximately evenly across buckets. Load balancing methods may distribute resource credits contained in wallets. This may include examining the number of credits in each wallet, and conditionally moving resource credits from wallets to buckets, based on a number of credits in each wallet, a number of base credits to remain in each wallet, expected use of credits, or other factors. Load balancing methods are discussed in further detail below.

FIG. 4 is a logical flow diagram generally showing one embodiment of a method 400 for allocating resources. Method 400 may employ at least a portion of the computing device 100 illustrated in FIG. 1, including credit request processor 154, resource shortage processor 156, load balancing processor 158, or any of the device variations discussed herein, or it may be performed with other devices. In one embodiment, method 400 employs at least a portion of the components illustrated in FIG. 2.

Method 400 begins, after a start block, at block 402, where a request for resource credits may be received. In one embodiment, the resource credits correspond to physical memory pages in a virtual memory system. In one embodiment, the resource credits may correspond to units of I/O bandwidth or system data structures.

Method 400 may then flow to block 404. At block 404, the credit contents of a local wallet corresponding to the current thread are examined to determine the number of available credits in the wallet. A determination is made of whether the number of available credits is enough to satisfy the request for credits. If the determination is affirmative, method may flow to block 406, where a number of credits are deducted from the local wallet. In one embodiment, the number of credits is equal to the number of credits requested. Method may then flow to a return block, where the method returns successfully to a calling program.

If, at block 404, it is determined that the local wallet does not have enough credits available, method may flow to block 408. At block 408, the credit contents of a local bucket corresponding to the CPU or core upon which the current thread is executing is examined to determine the number of available credits at the bucket. As used herein, examining the credit contents may be performed by analyzing a value representing the number of available credits. This may include retrieving the value in any of a number of ways. A determination is made of whether the number of available credits is enough, by itself or in combination with the available credits in the local wallet, to satisfy the request for credits. If the determination is affirmative, method may flow to block 410, where a number of credits are moved from the local bucket to the local wallet.

This may include deducting the number of credits from the local bucket, and adding an equal number of credits to the local wallet. Method may then flow to block 412, where a number of credits to satisfy the current credit request may be deducted from the local wallet. Method may then flow to a return block, where the method returns successfully to a calling program.

As discussed above, one or combinations of actions that are performed in method 400 may include locking and unlocking credit containers to avoid conflicts when performing actions. For example, actions 404 and 406 may include locking the local wallet prior to determining whether the local wallet has enough credits and unlocking the local wallet after deducting credits from the local wallet or after determining that not enough credits are in the local wallet. Similarly, actions 408 and 410 may include locking and unlocking the local bucket before determining the number of credits available and after moving credits from the local bucket, or after determining that not enough credits are in the bucket. In one embodiment, the local wallet may be locked prior to, or at the beginning of, action 404, and unlocked after action 406, 412, or 408. Various other sequences of locking and unlocking credit containers may be performed in accordance with the present invention.

It is to be noted that by examining the local bucket, in some embodiments the method 400 may reduce contention for the bucket of credits. This contention may include contention for the lock that protects the credit container or contention for ownership of the cache line that holds the credit container. In an environment where two threads are executing on respective cores or CPUs, each thread has its own corresponding local bucket, so contention for the bucket may be reduced.

If, at block 408, it is determined that not enough credits exist in the local bucket to satisfy the current request, method may flow to block 414, where a resource shortage method is invoked. Briefly, a resource shortage method may examine non-local buckets, or move credits to a local bucket or a predetermined primary bucket. A resource shortage method is illustrated in FIG. 5 and described in further detail below.

After invoking a resource shortage method at block 414, method may flow to decision block 416, where a determination may be made of whether the method resulted in enough credits being found to satisfy the current request. If the determination is affirmative, the method may flow back to block 404, to repeat at least a portion of the actions of examining the local wallet or the local bucket. The resource shortage method may have moved credits so that the local wallet or the local bucket may have enough credits, so that the repeated actions result in enough credits being found, allowing the method 400 to return successfully following actions 406 or 410.

If, at block 416, it is determined that enough credits have not been found following a resource shortage method, method 400 may flow to block 418, where a determination is made of whether the request for credits included or was accompanied by a request to block the current thread if the requested credits are unavailable. If there is not a request to block the thread, method 400 may flow to a return block, where the method returns, indicating a failure, to a calling program.

If at block 418, it is determined that a request to block the current thread has been made, method 400 may flow to block 420, where the current thread is blocked, or put into a sleep mode. Blocking may include waiting for a resource shortage condition variable or signal, corresponding to the resource type, to waken the thread. The condition variable or signal may be set by another method that has caused credits to move such that enough credits may be available for the request of the current thread. For example, another thread may free a number of credits, and the credits may be put into one or more buckets. A load balancing method may move credits from a non-local wallet to a bucket, where it becomes available for the current thread. One or more of such actions may occur and result in a signal to waken the current method.

Upon being awakened by a signal or condition variable, method may then flow back to block 404, where at least some of the actions described herein may be repeated. The repeated actions may include any one or more of examining and deducting credits from a local wallet, examining and deducting credits from a local bucket, or performing a resource shortage method.

FIG. 5 is a logical flow diagram generally showing one embodiment of a method 500 for handling a resource shortage in accordance with the present invention. Method 500 may employ at least a portion of the computing device 100 illustrated in FIG. 1, including resource shortage processor 156, or it may be performed with other devices. In one embodiment, method 400 employs at least a portion of the components illustrated in FIG. 2. Method 500 may be performed in response to the action 414 of FIG. 4, wherein a resource shortage method is invoked in response to determining that not enough credits are found in a local wallet or a local bucket. In one embodiment, method 500 represents at least a portion of the actions of block 308 of FIG. 3.

Method 500 begins, after a start block, at block 502, where a random bucket is selected as a starting bucket. As used herein, the term random selection may include pseudo-random selection. The random bucket may be selected from among the buckets corresponding to each CPU or core, such as bucket 204 of FIG. 2.

Method 500 may then flow to block 504, where a loop of actions is begun. The loop iterates one or more times, through different buckets. In one embodiment, the ordering of buckets may be a predetermined order that is used by each thread performing method 500. The ordering may, for example, be performed in a numeric, positional, or algorithmic order. In one embodiment, the ordering is such that, though different invocations of the method may select different starting buckets, the ordering is the same for each invocation. During each iteration of the loop beginning at block 504, a bucket corresponding to the iteration is referred to as the current bucket. During the first iteration, the random bucket selected at block 502 may be the current bucket.

Method may then flow to block 506. At block 506, the credit contents of the current bucket are examined to determine the number of available credits at the bucket. A determination is made of whether the number of available credits is enough, by itself or in combination with the available credits in the wallet that is local to the requesting thread. If the determination is affirmative, method may flow to block 508, where a number of credits are deducted from the current bucket. The number of credits may be added to the requesting thread's local bucket or local wallet. Method may then flow to a return block, where the method returns successfully to a calling program.

If, at block 506, it is determined that not enough credits exist in the current bucket to satisfy the current request, method may flow to block 510. At block 510, the current bucket is changed to the next bucket, in preparation for the next iteration of the loop beginning at block 504. If the loop has not completed its iterations, method may flow back to the beginning of loop 504, such that the next current bucket is examined for credits.

If, at block 510, it is determined that the method has iterated through all relevant buckets, method 500 may flow out of the loop to block 512. At block 512, another loop of actions is begun. This loop iterates one or more times, through different buckets. In one embodiment, the ordering of buckets is a predetermined order that is used by each thread performing method 500. The ordering may, for example, be performed in a numeric, positional, or algorithmic order. In one embodiment, the ordering is such that the ordering is the same for each invocation. The ordering used in this loop may be the same ordering, or a different ordering, as the ordering used in the loop beginning at block 504 discussed above. During each iteration of the loop beginning at block 512, a bucket corresponding to the iteration is referred to as the current bucket.

In one embodiment, the loop beginning at block 512 always begins at a predetermined bucket, referred to as the "primary bucket." It may also be referred to as "bucket zero." The primary bucket may be any one of the buckets corresponding to a CPU or core. A primary bucket is used so that each instance of the loop performed by different threads begins at one specified bucket. Using a common primary bucket and a common ordering acts to avoid conflict or deadlock among two or more threads. Upon beginning the first iteration of this loop, a credit sum may be initialized to zero.

Method may then flow to block 514, where the number of credits in the current bucket are added to the credit sum. Method may then flow to block 516, where a determination is made of whether the credit sum is a high enough value to satisfy the request for credits. If it is, the method may flow to block 518, where credits are deducted from all of the buckets that have been included in the credit sum. These credits may be moved to the local wallet corresponding to the requesting thread. Method flow may then proceed to a return block, where the method 500 returns successfully to a calling program. As illustrated at block 416 of FIG. 4, in one embodiment, when the method 500 returns successfully, method 400 may flow to block 404, to continue such that the credits moved into the local wallet will be found and used to satisfy the current request for credits.

If, at block 516, it is determined that the credit sum is not high enough to satisfy the request for credits, method may flow to block 520. At block 520, the current bucket is changed to the next bucket, in preparation for the next iteration of the loop beginning at block 512. If the loop has not completed its iterations, method may flow back to the beginning of loop 512, such that the next current bucket is examined for credits.

If, at block 520, it is determined that the method has iterated through all relevant buckets, method 500 may flow out of the loop to block 522. Reaching block 522 may be an indication that all of the buckets have been examined, and not enough credits have been found. At block 522, the credits from all of the buckets may be moved to the primary bucket, and a resource shortage flag may be set. The resource shortage flag may serve as an indication that, at least for the current instance of method 500, a shortage of the desired resource has been found, and that credits have been consolidated at the primary bucket. This flag may be used in subsequent invocations of the resource shortage method 500 or the request for credits method 400, by the current thread or other threads, as an indication to first look at the primary bucket for credits. For example, in one embodiment, in an invocation of method 500, if the resource shortage flag is set, at block 502, the primary bucket may be selected as the starting bucket rather than a random bucket. In one embodiment, in an invocation of method 500, if the resource shortage flag is set, after a start block the method may flow to block 512, to search through buckets beginning at the primary bucket, as discussed above. In one embodiment, in method 400, if the resource shortage flag is set, after receiving a request for credits at block 402, method may flow directly to block 414 to invoke a resource shortage method, or method 400 may examine the primary block for credits. The term "resource shortage flag" may refer to a set of flags, for example a flag corresponding to each bucket. Setting the resource shortage flag may include setting one, all, or a subset of the resource shortage flags. For example, a resource shortage flag corresponding to each bucket may be set prior to unlocking each bucket during the actions of method 500 or a variation thereof. Other implementations that use the resource shortage flag to optimize operations by examining the primary bucket may be used in accordance with the present invention.

Method may then flow to a return block, where the method returns, indicating a failure to a calling program. In one embodiment, the calling program may be performing the method 400 of FIG. 4. As illustrated in FIG. 4, where the method 500 may be performed within the action block 414, a return of failure may result in a determination at block 416 that enough credits have not been found, and the method 400 may flow through block 418 to either sleep at block 420 or return a failure status, based on whether a block has been requested, as discussed above.

In method 500, locks on buckets may be used to protect the integrity of operations. In one embodiment, in loop 504, a bucket is locked prior to examining it at block 506, and unlocked after deducting credits at block 508 or after determining that not enough credits are in the bucket at block 506. In one embodiment, in loop 512, each bucket is locked prior to examining or retrieving credits at block 514, the buckets may remain locked while subsequent buckets are examined and processed, and each of the locked buckets is unlocked after deducting credits from them at block 518 or at block 522.

One aspect of the invention may include a method for freeing resource credits under a resource shortage condition. In one embodiment, freeing resource credits may include the following actions. The primary bucket may be locked. After the primary bucket is locked, the number of credits in the primary bucket may be incremented by the number of credits to be freed. The resource shortage condition variable corresponding to the resource type may be signaled, to waken any threads that are blocking on the condition variable, as discussed in FIG. 4. The primary bucket may then be unlocked, allowing access to the bucket. Any one or more threads that are awakened may then retry allocating credits, such as by performing the method of FIG. 4, or a portion thereof. In one embodiment, after adding credits to the primary bucket, the resource shortage condition variable is selectively signaled, based on any one or more of a number of factors, including the number of credits added to the primary bucket, the number of credits in the primary bucket after adding credits, a number of credits that a blocked thread has requested, and the like.

In one embodiment, a load balancing thread may perform actions in the background to reclaim unused credits from wallets. This type of thread may execute at times based on specified conditions. In one embodiment, this thread executes when the system is in a resource shortage condition. In one embodiment, this thread may execute in non-shortage conditions as well. In one embodiment, a thread may examine each thread wallet for unused credits, and selectively deduct at least some of the unused credits from each wallet, moving the credits to the primary bucket, to the bucket that is local to the respective wallet, or a combination thereof. In one embodiment, credits are selectively moved from wallets based on the number of credits in the wallet and a specified base number of credits that is desired to remain in the wallet. The base number of credits may vary among wallets. The base number may be dynamically determined, based on factors such as history of use, expected use, and the like.

In one embodiment, a load balancing thread may distribute credits among buckets. This may be the same load balancing thread or a different thread from the load balancing thread accessing wallets and moving credits from wallets. Distributing credits among buckets may include moving credits from the primary bucket to other buckets. Load balancing may include traversing all buckets, or a portion thereof, and distributing credits contained in each bucket to other buckets. In one embodiment, credits may be distributed approximately evenly across buckets. In one embodiment, a proportion of credits to be distributed to each bucket may be based on one or more of a number of factors. These factors may include capacity of a processor or core corresponding to the bucket, types of processes executing on a processor or core corresponding to the bucket, history of use or expected use of the credits by local threads, number of credits contained in wallets that are local to each bucket, and the like. In one embodiment, in a resource shortage condition, the load balancing thread makes a determination of whether enough credits have been freed so that a resource shortage condition non longer exists. If the result of such a determination is that the system does not need to be in a resource shortage condition, a resource shortage flag is cleared. A resource shortage condition variable may be signaled, to waken any waiting threads.

It will be understood that each block of the flowchart illustrations of FIGS. 3-5, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented method such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustrations may also be performed concurrently with other blocks or combinations of blocks, or even in a different sequence than illustrated without departing from the scope or spirit of the invention.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system for managing a limited resource, comprising:

a plurality of hardware processing units;

a plurality of buckets, each of the plurality of buckets corresponding to a single respective hardware processing unit of the plurality of hardware processing units;

program instructions operative to cause the plurality of hardware processing units to perform actions, the actions including:

receiving, in a thread executing at a first hardware processing unit of the plurality of hardware processing units, a first request for resource units;

identifying a wallet allocated to the thread, wherein the wallet is allocated only to the thread, wherein the wallet comprises credits, allocated to the thread, for resource units;

determining that the wallet allocated to the thread does not comprise enough credits to fulfill the first request, wherein each credit is representative of a number of resource units;

selecting, in response to determining that the wallet does not comprise enough credits, a first bucket of the plurality of buckets based on the first bucket corresponding to the first hardware processing unit and based on the first hardware processing unit executing the thread, wherein the first bucket comprises credits, allocated to the first hardware processing unit, for resource units;

selectively determining that the first bucket corresponding to the first hardware processing unit comprises enough credits to fulfill the first request;

selectively retrieving at least one credit from the first bucket and adding the retrieved at least one credit to the wallet;

deducting at least one credit from the wallet to fulfill the first request;

receiving, in the thread, a second request for resource units;

determining that the wallet allocated to the thread does not comprise enough credits to fulfill the second request;

selectively determining that the first bucket does not comprise enough credits to fulfill the second request; and selectively retrieving at least one credit from a second bucket corresponding to a second hardware processing unit, based on determining that the wallet allocated to the thread and the first bucket do not comprise enough credits to fulfill the second request.

2. The system of claim 1, wherein the actions further include load balancing the first bucket and a second bucket of the plurality of buckets by moving credits between the first bucket and the second bucket.

3. The system of claim 1, wherein selectively retrieving at least one credit from the first bucket is based on an aggregate of credits in the wallet and the first bucket.

4. The system of claim 1, further comprising a plurality of wallets, each wallet corresponding to a respective thread executing on a respective one of the hardware processing units, wherein the wallet is one of the plurality of wallets, and wherein the actions further include:

selectively moving credits from each of the wallets to a corresponding local bucket.

5. The system of claim 4, wherein the action of moving credits from each of the wallets is selectively performed based on at least one selected from a group consisting of whether a resource shortage condition exists or whether a number of credits contained in each wallet exceeds a predetermined number of credits.

6. The system of claim 1, wherein the actions further include:

selectively blocking the thread based on whether enough credits to fulfill the request are found; and if the thread is blocked, selectively unblocking the thread based on whether credits have been moved between the first bucket and the second bucket.

7. The system of claim 1, wherein the actions further include:

determining whether an aggregate of credits distributed among the second bucket and at least one other bucket is sufficient to fulfill the request; and selectively moving credits from the second bucket and the at least one other bucket to the first bucket, based on whether the aggregate of credits is sufficient to fulfill the request.

8. The system of claim 1, wherein the actions further include:

determining whether an aggregate of credits distributed among the second bucket and at least one other bucket is sufficient to fulfill the request; and selectively moving credits from the second bucket and the at least one other bucket to a primary bucket other than the first bucket, based on whether the aggregate of credits is sufficient to fulfill the request.

9. The system of claim 1, wherein each resource unit corresponds to one of a physical page of memory, a unit of I/O bandwidth, or a system data structure.

10. A computer based method of providing resource units in a computer system having a plurality of hardware processing units, comprising:

providing a set of buckets, each bucket corresponding to a single respective hardware processing unit of the plurality of hardware processing units;

providing a set of wallets, each wallet allocated to a single thread executing on one of the plurality of hardware processing units;

distributing a plurality of credits among the buckets, each credit corresponding to a resource unit;

in response to receiving a first request for resource units from a requesting thread:

identifying a wallet of the set of wallets allocated to the requesting thread, wherein the wallet comprises credits, allocated to the thread, for resource units;

determining that the wallet does not comprise enough credits to successfully respond to the first request;

selecting, in response to determining that the wallet does not comprise enough credits, a first bucket of the set of buckets based on the first bucket corresponding to a first hardware processing unit executing the requesting thread, wherein the first bucket comprises credits, allocated to the first hardware processing unit, for resource units;

determining that the first bucket comprises enough credits to successfully respond to the first request; and selectively retrieving at least one credit from the first bucket and adding the retrieved at least one credit to the wallet;

deducting at least one credit from the wallet to fulfill the first request;

in response to receiving a second request for resource units from the requesting thread:

determining that the wallet allocated to the thread does not comprise enough credits to fulfill the second request;

selectively determining that the first bucket does not comprise enough credits to fulfill the second request; and selectively retrieving at least one credit from a second bucket corresponding to a second hardware processing unit, based on determining that the wallet allocated to the thread and the first bucket do not comprise enough credits to fulfill the second request; and periodically moving credits from at least some of the wallets to at least some of the buckets.

11. The computer based method of claim 10, further comprising:

in response to receiving the second request, selectively moving credits from a plurality of the buckets to a primary bucket at least partly based on a number of credits in the plurality of the buckets.

12. The computer based method of claim 10, further comprising:

in response to receiving the request, selectively moving credits from a plurality of the bucket to a primary bucket at least partly based on a number of credits in each of the plurality of the buckets; and periodically performing a load balancing process that redistributes credits among the buckets.

13. The computer based method of claim 10, wherein the credits represent at least one selected from a group consisting of units of physical memory or units of I/O bandwidth.

14. The computer based method of claim 10, wherein each of the buckets is sized to fit within a respective CPU cache line.

* * * * *